United States Patent
Li et al.

(10) Patent No.: US 10,203,749 B2
(45) Date of Patent: Feb. 12, 2019

(54) METHOD AND APPARATUS FOR SAVING POWER, INCLUDING AT LEAST TWO POWER SAVING MODES

(71) Applicant: MARVELL WORLD TRADE LTD, St. Michael (BB)

(72) Inventors: Jie Li, Shanghai (CN); Chao Xie, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 4 days.

(21) Appl. No.: 15/398,456

(22) Filed: Jan. 4, 2017

(65) Prior Publication Data

US 2017/0192492 A1 Jul. 6, 2017

Related U.S. Application Data

(60) Provisional application No. 62/274,530, filed on Jan. 4, 2016.

(51) Int. Cl.
*G06F 1/20* (2006.01)
*G06F 1/32* (2006.01)

(52) U.S. Cl.
CPC .......... *G06F 1/3296* (2013.01); *G06F 1/206* (2013.01); *G06F 1/324* (2013.01); *G06F 1/3206* (2013.01); *Y02D 10/126* (2018.01); *Y02D 10/16* (2018.01); *Y02D 10/172* (2018.01)

(58) Field of Classification Search
None
See application file for complete search history.

(56) References Cited

U.S. PATENT DOCUMENTS

| | | | |
|---|---|---|---|
| 2009/0235099 A1* | 9/2009 | Branover | G06F 1/3203 713/322 |
| 2009/0235105 A1* | 9/2009 | Branover | G06F 1/3203 713/330 |
| 2009/0235260 A1* | 9/2009 | Branover | G06F 1/3203 718/102 |
| 2010/0058078 A1* | 3/2010 | Branover | G06F 1/3203 713/300 |
| 2011/0078478 A1* | 3/2011 | Branover | G06F 1/3203 713/323 |
| 2011/0131427 A1* | 6/2011 | Jorgenson | G06F 1/26 713/300 |
| 2013/0007494 A1* | 1/2013 | Branover | G06F 1/3203 713/323 |
| 2017/0038813 A1* | 2/2017 | Vanka | G06F 1/3206 |

* cited by examiner

*Primary Examiner* — J. H. Hur

(57) ABSTRACT

Aspects of the disclosure provide a circuit that includes processing circuits and a power mode control circuit. The processing circuits are configured to have at least a first power saving mode and a second power saving mode having different power saving efficiency under different scenarios. The processing circuits are configured to determine a power saving mode for the processing circuits based on a threshold that is a function of one or more operational parameters. Then, the power mode control circuit is configured to receive information from the processing circuits that is indicative of the power saving mode, and control the processing circuits to enter the determined power saving mode.

14 Claims, 3 Drawing Sheets

METHOD AND APPARATUS FOR SAVING POWER, INCLUDING AT LEAST TWO POWER SAVING MODES

INCORPORATION BY REFERENCE

This present disclosure claims the benefit of U.S. Provisional Application No. 62/274,530, "Selection of Low-power Mode of CPU Core Based on Voltage, Clock and Temperature" filed on Jan. 4, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Power management techniques are used in battery powered devices to extend battery life and reduce charging cycle. In an example, a battery powered device includes a central processing unit (CPU) having an active mode and a plurality of power saving modes. The CPU has different levels of power saving in the different power saving modes. When the CPU is idle, the CPU enters one of the power saving modes to save power.

SUMMARY

Aspects of the disclosure provide a circuit that includes processing circuits and a power mode control circuit. The processing circuits are configured to have at least a first power saving mode and a second power saving mode having different power saving efficiency under different scenarios. The processing circuits are configured to determine a power saving mode for the processing circuits based on a threshold that is a function of one or more operational parameters. Then, the power mode control circuit is configured to receive information from the processing circuits that is indicative of the power saving mode, and control the processing circuits to enter the determined power saving mode.

According to an aspect of the disclosure, the processing circuits are configured to determine the power saving mode based on the threshold that is a function of at least one of a supply voltage, a clock frequency, and a surrounding temperature. In an example, the processing circuits are configured to determine a target residency time as a function of at least one of the supply voltage, the clock frequency and the surrounding temperature, and associate the target residency time with the first and the second power saving mode. For example, the processing circuits are configured to compare a predicted residency time with the target residency time, and determine the second power saving mode when the predicted residency time is longer than the target residency time.

In an embodiment, the power mode control circuit includes a power switch circuit configured to provide an adjustable supply voltage to the processing circuits, and a clock gating circuit configured to provide a gated clock to the processing circuits. The clock gating circuit is configured to disable transitions in the gated clock and the power switch circuit is configured to maintain the supply voltage to the processing circuits to configure the processing circuits in the first power saving mode, and the power switch circuit is configured to switch off the supply voltage to the processing circuits to configure the processing circuits in the second power saving mode.

According to an aspect of the disclosure, the processing circuits are first processing circuits in a first core circuit, and the power mode control circuit is a first power mode control circuit in the first core circuit. The circuit further includes a second core circuit that is similarly configured as the first core circuit.

Aspects of the disclosure provide a method for power saving. The method includes storing a threshold that is a function of one of more operational parameters for processing circuits. The threshold is associated with a first power saving mode and a second power saving mode having different power saving efficiencies in different scenarios. The method further includes determining, by the processing circuits, a power saving mode based on the threshold, informing a power mode control circuit of the determined power saving mode, and controlling the processing circuits to enter the determined power saving mode.

Aspects of the disclosure provide an apparatus. The apparatus includes a memory configured to store software instructions to determine a power saving mode based on a threshold that is a function of one or more operational parameters, and a processing unit configured to have at least a first power saving mode and a second power saving mode. The processing unit is configured to execute the software instructions to select a power saving mode from the at least the first power saving mode and the second power saving mode based on the threshold, and enter the determined power saving mode.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
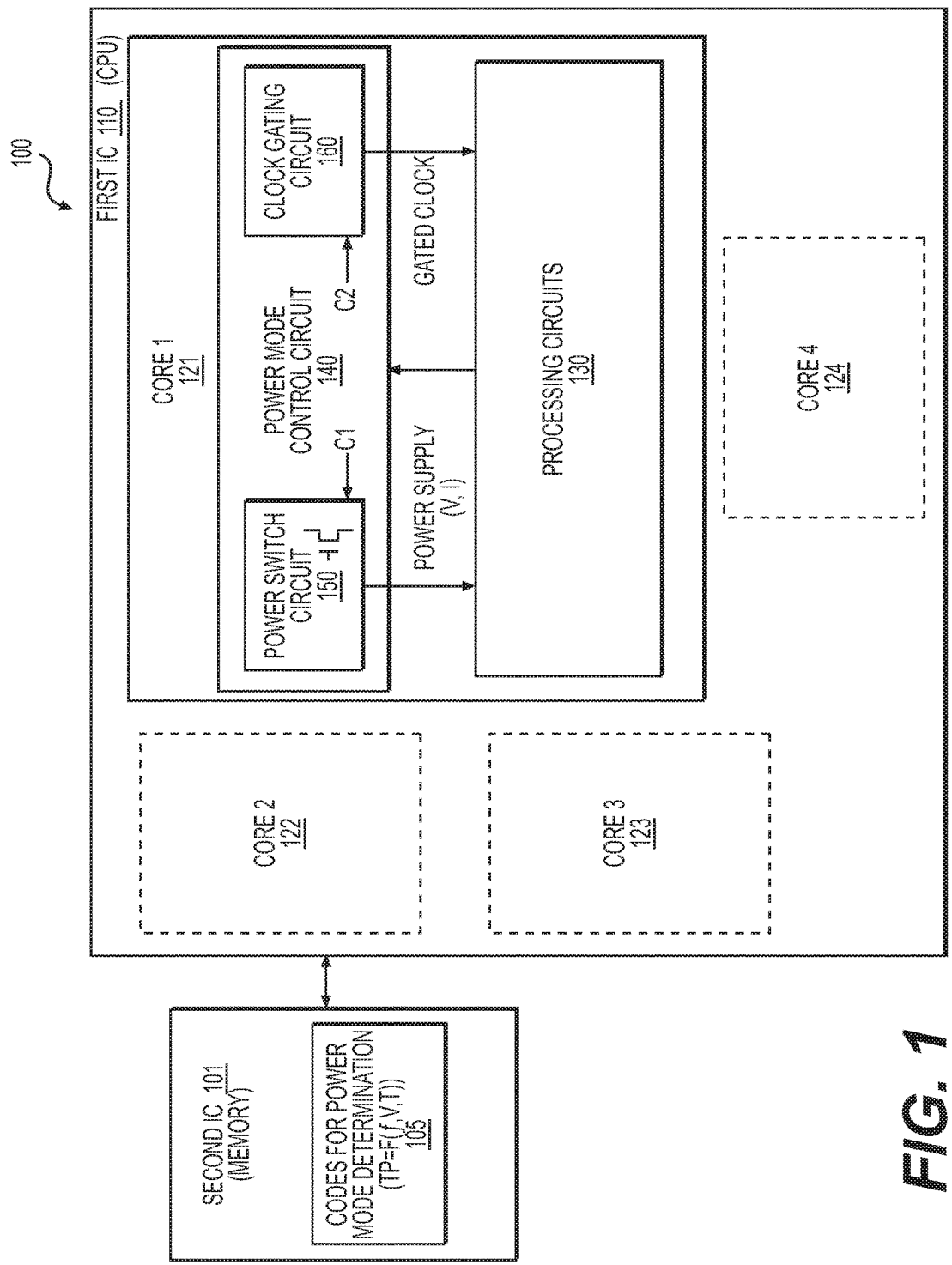
FIG. 1 shows a block diagram of an electronic device 100 according to an embodiment of the disclosure.

FIG. 1 shows a block diagram of an electronic device 100 according to an embodiment of the disclosure. The electronic device 100 operates under certain operational parameters, such as a clock frequency f; a supply voltage V, a surrounding temperature T, and the like. The electronic device 100 uses a multi-mode power management technique to manage power consumption. According to the multi-mode power management technique, the electronic device 100 is configured to have multiple power saving modes that can have different power saving efficiency in different scenarios. Further, according to the multi-mode power management technique, threshold parameters are determined and are associated with the power saving modes. The threshold parameters are used by the electronic device 100 to determine a suitable power saving mode to enter under certain scenario. According to an aspect of the disclosure, at least one of the threshold parameters is a function of the operational parameters.

The electronic device 100 can be any suitable electronic device, such as a desktop computer, a laptop computer, a tablet computer, a cell phone, a smart phone, a wearable device, a camera, a video recorder, a sensor device, a monitor device, and the like. In an embodiment, the electronic device 100 is a battery powered device. In another embodiment, the electronic device 100 is plugged in a wall power outlet to receive power.

According to an aspect of the disclosure, the electronic device 100 includes a first integrated circuit (IC) chip 110 and a second IC chip 101 coupled together as shown in FIG. 1. The first IC chip 110 is a processing chip, such as a central processing unit (CPU) chip, and the like. The second IC chip 101 is a memory IC chip configured to store data and software codes.

In an embodiment, the first IC chip 110 includes one or more independent cores 121-124 (e.g., processing cores). In the embodiment, the individual cores 121-124 operate independently, and can execute respective instructions at the same time. In an example, the processing units 121-124 are of a same design. In another example, the processing units 121-12.4 are of different designs.

It is noted that the first IC chip 110 includes other suitable components (not shown), such as a cache circuit, a memory controller circuit, input/output (I/O) circuits, and the like. The cores 121-124 work in conjunction with the other components. For example, the core 121 accesses the second IC chip 101 via the other components, to read instruction codes from the second IC chip 101, and executes the instruction codes. In another example, the second IC chip 101 is writable, and the core 121 accesses the second IC chip 101 via the other components to write the instruction codes and/or data into the second IC chip 101.

The second IC chip 101 can be any suitable memory chip, such as dynamic random access memory (DRAM) chip, static random access memory (SRAM), flash memory chip, and the like. According to an aspect of the disclosure, the second IC chip 101 stores instruction codes 105 for power mode determination. The instruction codes 105 are configured to determine a power mode based on at least one threshold parameter TP that is a function of one or more of the operational parameters, such as the clock frequency f the supply voltage V, the surrounding temperature T, and the like.

According to an aspect of the disclosure, a core unit, such as the core 121 is configured to have multiple power saving modes that have different power efficiency in different scenarios. In the FIG. 1 example, the core 121 includes processing circuits 130 and a power mode control circuit 140 coupled together. The processing circuits 130 include various circuit components (not shown), such as arithmetic logic unit (ALAI) for arithmetic and logic operations, registers, and the like. The power mode control circuit 140 controls the processing circuits 130 to enter different power modes.

In the FIG. 1 example, the power mode control circuit 140 includes a power switch circuit 150, a clock gating circuit 160, and control logics (not shown). In an embodiment, the power switch circuit 150 provides a power supply of appropriate voltage (V) and current (I), and the clock gating circuit 160 provides a gated clock to the processing circuits 130 to collectively configure the processing circuits 130 to have one of three operation modes, such as an active mode, a first power saving mode (e.g., a light sleep mode) and a second power saving mode (e.g., a deep sleep mode).

In an embodiment, the processing circuits 130 include a local power distribution network (not shown) to distribute the power supply to circuits in the processing circuits 130. The first IC chip 110 includes a global power distribution network (not shown) to distribute, for example, a received power supply from a power pin of the first IC chip 110, to the cores 121-124, and other circuits. The power switch circuit 150 includes a switch (not shown) configured to connect or disconnect the local power distribution network with the global power distribution network.

In an example, the power switch circuit 150 includes a metal oxide semiconductor (MOS) transistor as the switch. For example, one of the source/drain terminals of the MOS transistor is connected to the local power distribution network in the processing circuits 130, and the other of the source/drain terminals of the MOS transistor is connected to a power supply rail of the global power distribution network. Then, the gate terminal of the MOS transistor receives a power control signal (e.g., C1), and the power control signal controls the MOS transistor to connect or disconnect the power supply rail with the local power distribution network. In an example, when the power control signal (C1) has a relatively high voltage (e.g., about the level of the supply voltage V), the MOS transistor is turned to switch on the power supply; and when the power control signal (C1) has a relatively low voltage (e.g., about the level of ground), the MOS transistor is turned off to switch off the power supply.

In an embodiment, the processing circuits 130 include a local clock distribution tree (not shown) to distribute the gated clock to circuits in the power processing circuits 130. The first IC chip 110 includes a global clock distribution tree (not shown) to distribute, for example, a received clock from a clock pin of the first IC chip 110, or a clock signal output from a phase-locked loop (PLL) circuit on the first IC chip 110, to the cores 121-124, and other circuits. The clock gating circuit 160 includes a logic gate, such as an AND logic gate, an NAND logic gate, and the like. The logic gate combines a clock control signal (e.g., C2) with the clock provided by the global clock distribution tree to generate the gated clock. In an example, when the clock control signal (C2) has a relatively high voltage (e.g., about the level of the supply voltage V), the AND logic gate combines the clock control signal and the global clock to enable transitions in the gated clock; and when the clock control signal (C2) has a relatively low voltage (e.g., about the level of ground), the AND logic gate combines the clock control signal and the global clock to disable transitions in the gated clock.

According to an aspect of the disclosure, the power mode control circuit 140 is configured to provide the power supply and the gated clock to the processing circuits 130 to configure the processing circuits 130 in one of three power modes. For example, when the power supply is switched on, and the gated clock is enabled with transitions, the processing circuits 130 are in an active mode. When the power supply is switched on, and the gated clock is disabled without transitions, the processing circuits 130 are in a first power saving mode. The first power saving mode is also referred to as a light sleep mode or a standby mode. When the power supply is switched off and the gated clock is disabled without transitions, the processing circuits 130 are in a second power saving mode. The second power saving mode is referred to as a deep sleep mode.

According to an aspect of the disclosure, the first power saving mode and the second power saving mode have different power saving efficiencies in different scenarios. In an embodiment, when a residency time in a power saving mode is longer than a threshold, the second power saving mode provides more power saving than the first power saving mode; however, when the residency time is shorter than the threshold, the second power saving mode provides less power saving than the first power saving mode.

Specifically, the processing circuits 130 take different time (latency) to enter/exit different power saving modes, and generally, the processing circuits 130 take more time to enter/exit the deeper power saving mode (e.g., deeper sleep mode). In an example, the processing circuits 130 take a first entrance latency (t1N) to enter the first power saving mode from an active mode, and take a first exit latency (t1X) to exist the first power saving mode and restore to the active mode. Further, the processing circuits 130 take a second entrance latency (t2N) to enter the second power saving mode from an active mode, and take a second exit latency (t2X) to exist the second power saving mode and restore to the active mode.

Generally, the second entrance/exit latencies are much longer than the first entrance/exit latencies. In an example, to enter the first power saving mode from the active mode, the clock control signal C2 changes for example from a relatively high voltage to a relatively low voltage (e.g., logic "1" to logic "0"), and the clock gating circuit 160 disables transitions in the gated clock. To exit the first power saving mode, the clock control signal C2 changes for example from a relatively low voltage to a relatively high voltage, and the clock gating circuit 160 enables transitions in the gated clock. In an embodiment, the power supply remains switched on, thus the processing circuits 130 resumes operations on a next clock cycle when the transitions are enabled.

Further, in an example, to enter the second power saving mode from the active mode, the processing circuits 130 perform certain operations before the power down. For example, the processing circuits 130 stores state data in on-chip memory or off-chip memory before the power down. In an example, to exit the second power saving mode and return to the active mode, the local power distribution network takes time to be stable, and it takes time to fetch the state data to restore the processing circuits 130. Thus, the second entrance/exit latencies for the second power saving mode are much longer than the first entrance/exit latencies for the first power saving mode in an example.

Due to the different entrance/exit latencies, the first power saving mode and the second power saving mode have different power saving efficiencies under different residency time.

Figure 2:
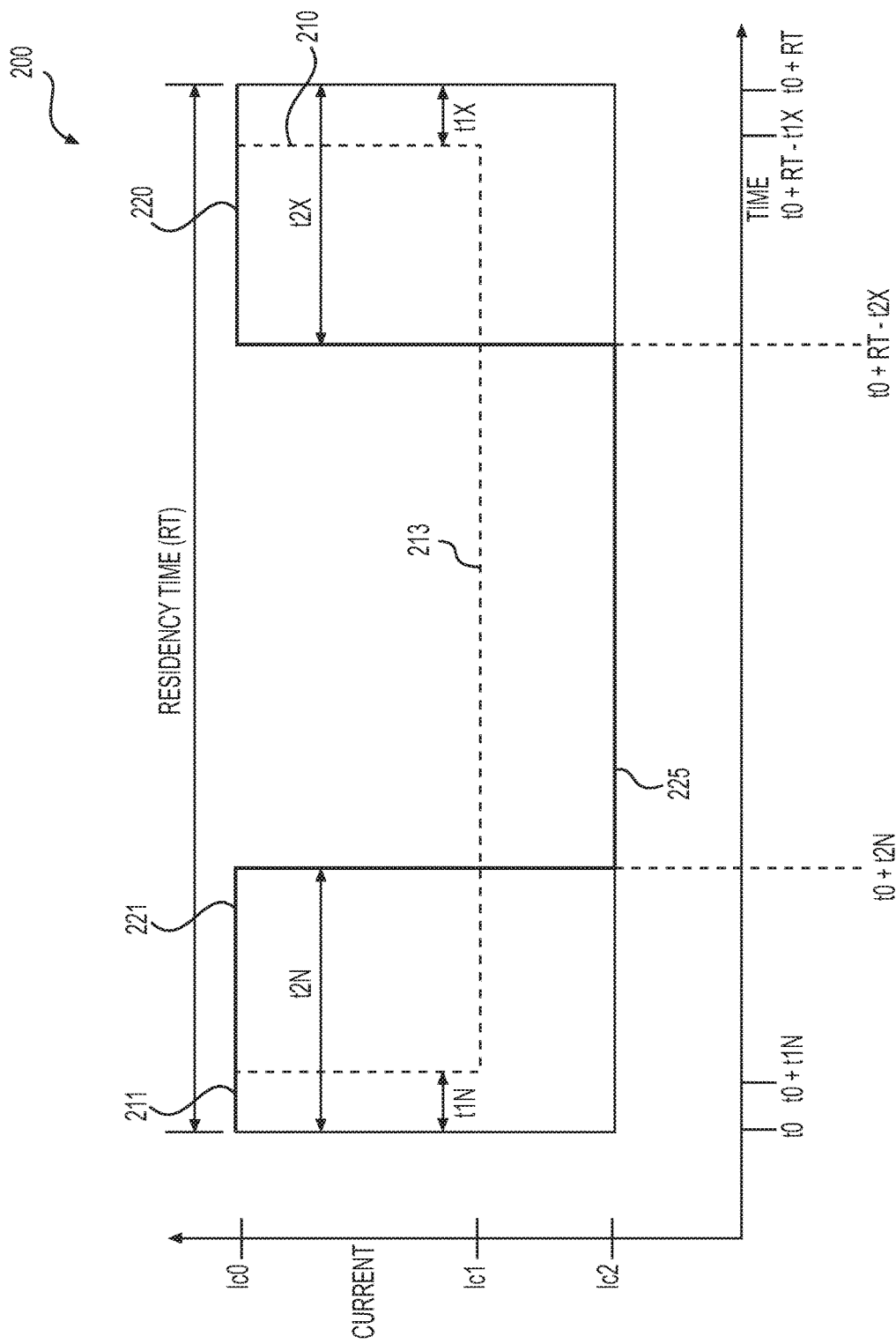
FIG. 2 shows a plot 200 illustrating power consumption in different power saving modes for the electronic device 100 according to an embodiment of the disclosure.

FIG. 2 shows a plot 200 illustrating power consumption in different power saving modes for the electronic device 100 according to an embodiment of the disclosure. In the example, the plot 200 shows the current provided by a power supply to the core 121 over time.

The plot 200 includes a first curve 210 and a second curve 220. The first curve 210 shows the change of the current over time during a residency time (RT) when the processing circuits 130 enter and exit the first power saving mode. The second curve 220 shows the change of the current over time during the residency time when the processing circuits 130 enter and exit the second power saving mode.

Specifically, in the FIG. 2 example, the current provided by the power supply has multiple levels. For example, when the processing circuits 130 are active, such as in the active mode, during an entrance latency (e.g., t1N, t2N) in a power saving mode, during an exit latency (e.g., t1X, t2X) in a power saving mode, and the like, the core 121 has a relatively large current level, such as shown by a normal current Ic0 in FIG. 2. When the processing circuits 130 are stable in the first power saving mode, the transitions in the gated clock are disabled, however because the supply voltage is still provided to the processing circuits 130, the core 121 has a medium current level, such as shown by a first current Ic1 in FIG. 2. When the processing circuits 130 are in the second power saving mode, the transitions in the gated clock are disabled, the supply voltage is switched off, the core 121 has a relatively low current level, such as shown by a second current Ic2 in FIG. 2.

In an example, the energy consumption (E1) during the residency time RT in the first power saving mode is calculated according to Eq. 1

$$E1 = (Ic0 - Ic1) \times V \times t1 + Ic1 \times V \times RT \qquad \text{Eq. 1}$$

where t1 denotes to a first latency for the first power saving mode, and is a sum of the first entrance latency t1N and the first exit latency t1X.

Further, in the example, the energy consumption (E2) during the residency time RT in the second power saving mode is calculated according to Eq. 2

$$E2 = (Ic0 - Ic2) \times V \times t2 + Ic2 \times V \times RT \qquad \text{Eq. 2}$$

where t2 denotes to a second latency for the second power saving mode, and is a sum of the second entrance latency t2N and the second exit latency t2X.

Then, the energy consumption difference is calculated according to Eq. 3:

$$E2 - E1 = (Ic0 - Ic2) \times V \times t2 - (Ic0 - Ic1) \times V \times t1 - (Ic1 - Ic2) \times V \times RT \qquad \text{Eq. 3}$$

It is noted that when the residency time RT is relatively large, the energy consumption difference according to Eq. 3 can be smaller than zero, thus the second power saving mode saves more power; however when the RT is relatively small, the energy consumption difference according to Eq. 3 can be larger than zero, thus the first power saving mode saves more power.

According to an aspect of the disclosure, the difference of the first current Ic1 and the second current Ic2 is the leakage current $I_{leakage}$, the difference of the normal current Ic0 and the first current Ic1 is the active current $I_{active}$, and the difference of the normal current Ic0 and the second current Ic2 is the sum of the active current $I_{active}$, and the leakage current $I_{leakage}$.

Thus, in an example, when a target residency time TR is estimated according to according to Eq. 4:

$$TR = ((I_{active} + I_{leakage}) \times t2 - I_{active} \times t1) / I_{leakage} \qquad \text{Eq. 4}$$

According to an aspect of the disclosure, the active current $I_{active}$ is a function of the supply voltage V and the clock frequency f, and the leakage current $I_{leakage}$ is a function of supply voltage V and the surrounding temperature T. Thus, the target residency time TR is a function of the supply voltage V, the clock frequency f and the surrounding temperature T.

In an embodiment, the target residency time TR is used to determine a suitable power saving mode to enter. In the FIG. 1 example, the second IC chip 101 stores the instruction codes 105 for power mode determination. The instruction codes use a threshold parameter TP that is a function of the supply voltage V, the dock frequency f and the surrounding temperature T. In an example, the target residency time TR is used as the threshold parameter.

It is noted that the target residency time TR can be determined using any suitable technique. In an example, Eq. 4 is used to determine the target residency time TR. For example, processing circuits 130 suitably measure the active current $I_{active}$ and the leakage current $I_{leakage}$ under a present operation condition, and uses the Eq. 4 to determine the target residency time TR. In another example, the target residency time is pre-determined for a combination of operational parameters, and is stored in association with the operational parameters. Thus, when the operational parameters are determined, the corresponding target residency time can be determined.

During operation, the processing circuits 130 execute the instruction codes 105 to determine the suitable power saving mode to enter. In an embodiment, when the core 121 is idle, the processing circuits 130 predict an idle time. Then, the processing circuits 130 compare the idle time with the target residency time TR. In an example, when the predicted idle time is longer than the target residency time TR, the processing circuits 130 determine to enter the second power saving mode. The processing circuits 130 provide information to the power mode control circuit 140 to indicate the second power saving mode. Accordingly, in an example, the power switch circuit 150 switches off the power supply to the processing circuits 130, and the clock gating circuit 160 disables transitions in the gated clock.

In the example, when the predicted idle time is shorter than the target residency time TR, the processing circuits 130 determine to enter the first power saving mode. The processing circuits 130 provide information to the power mode control circuit 140 to indicate the first power saving mode. Accordingly, in an example, the power switch circuit 150 maintains the power supply to the processing circuits 130 to be switched on, and the clock gating circuit 160 disables transitions in the gated clock.

It is noted that in an embodiment, the power mode control circuit 140 includes a timer configured to track the time in the power saving mode. When the time in the power saving mode exceeds the predicted idle time, the power mode control circuit 140 wakes up the processing circuits 130. For example, the power switch circuit 150 switches on the power supply to the processing circuits 130, and the clock gating circuit 160 enables transitions in the gated clock to wake up the processing circuits 130. It is noted that power mode control circuit 140 also responds to other suitable triggers to wake up the processing circuits 130, such that the processing circuits 130 exits the power saving mode.

It is noted that, in an embodiment, the multi-mode power saving technique is respectively applied at the core level to other cores 122-124. In another embodiment, the multi-mode power saving technique is used at the chip level in the first IC chip 110.

Figure 3:
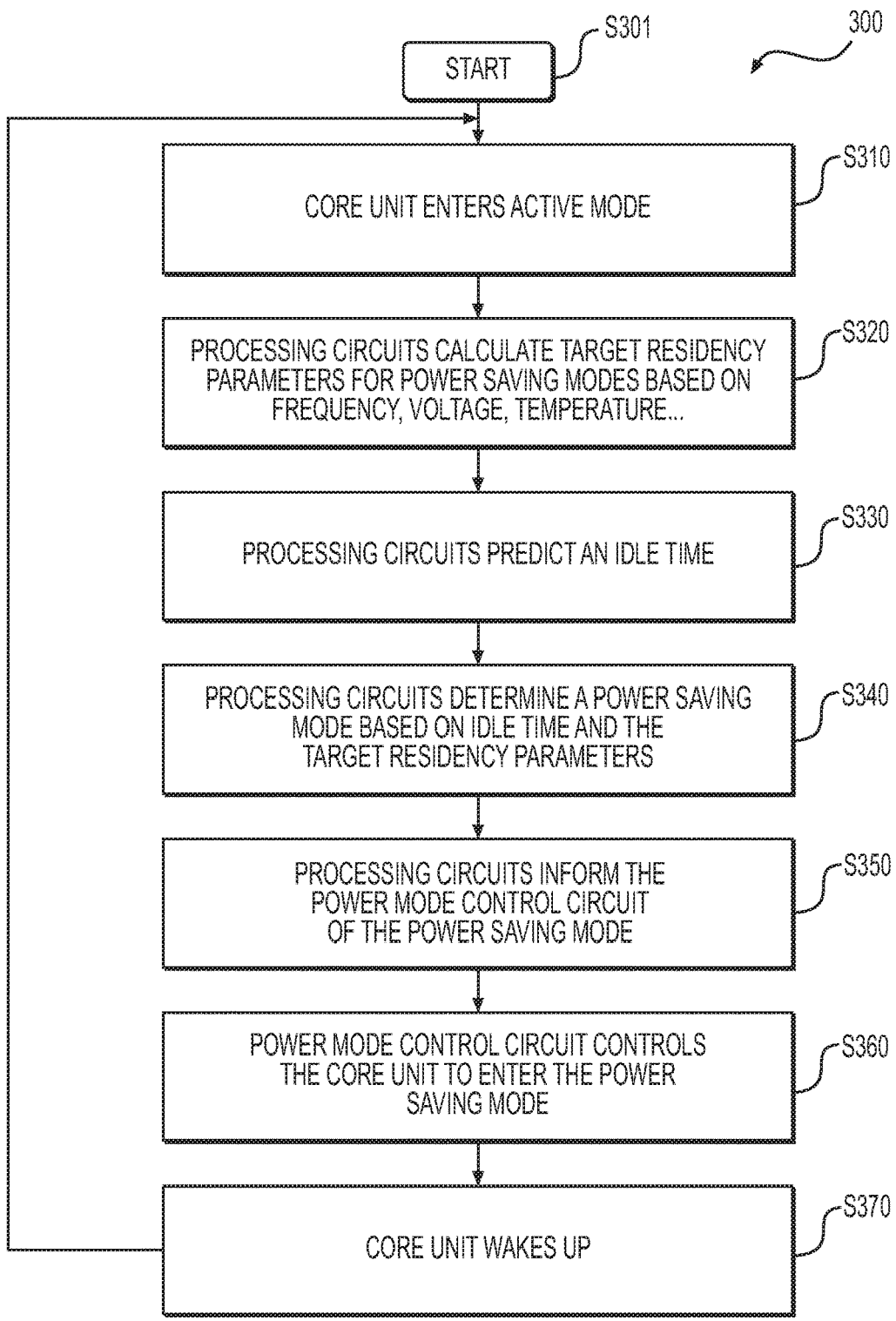
FIG. 3 shows a flow chart outlining a process 300 according to an embodiment of the disclosure.

FIG. 3 shows a flow chart outlining a process 300 according to an embodiment of the disclosure. In an example, the process 300 is executed in the electronic device 100 by a core unit, such as the core 121. The core unit includes processing circuits (e.g., the processing circuits 130), and a power mode control circuit (e.g., the power control circuit 140). The process starts at S301 and proceeds to S310.

At S310, the core unit enters the active mode. In the active mode, the power switch circuit 150 switches on the power supply, and the clock gating circuit 160 enables transitions in the gated clock, thus the processing circuits 130 executes instruction codes read from, for example the second IC 101.

At S320, processing circuits determine target residency parameters for power saving modes based on the supply voltage V, the clock frequency f and the surrounding temperature T. In an embodiment, target residency parameters are pre-determined and stored in association with the supply voltage V, the clock frequency f and the surrounding temperature T When the present operational parameters, such as the supply voltage V, the clock frequency f and the surrounding temperature T, are determined, the processing circuits determine the target residency parameter corresponding to the present operational parameters. In another embodiment, the active current and the leakage current $I_{leakage}$, are measured under the present operational parameters, and the processing circuits 130 calculate the target residency parameter according to Eq. 4.

At S330, processing circuits predict an idle time. It is noted that the processing circuits can use any suitable technique to predict the idle time.

At S340, processing circuits determine a power saving mode based on the idle time and the target residency parameters. In an example, the processing circuits 130 compare the idle time with the target residency time TR. When the predicted idle time is longer than the target residency time TR, the processing circuits 130 determine to enter the second power saving mode. When the predicted idle time is shorter than the target residency time TR, the processing circuits 130 determine to enter the first power saving mode.

At S350, the processing circuits provide information to the power mode control circuit to indicate the determined power saving mode. In an example, the processing circuits 130 provides a plurality of control bits, such as the power control signal C1, the clock control signal C2, to the power mode control circuit 140.

At S360, the power mode control circuit controls the core unit to enter the power saving mode. In an example, the power switch circuit 150 and the clock gating circuit 160 operate according to the control signals C1 and C2 to control the processing circuits 130 to enter the determined power saving mode. For example, to enter the second power saving mode, in an example, the power switch circuit 150 switches off the power supply to the processing circuits 130, and the clock gating circuit 160 disables transitions in the gated clock. To enter the first power saving mode, the power switch circuit 150 maintains the power supply to the processing circuits 130 to be switched on, and the clock gating circuit 160 disables transitions in the gated clock.

At S370, the core unit wakes up from the power saving mode. In an example, the power mode control circuit 140 includes a timer configured to track the time in the power saving mode. When the time in the power saving mode exceeds the predicted idle time, the power mode control circuit 140 wakes up the processing circuits 130. For example, the power switch circuit 150 switches on the power supply to the processing circuits 130, and the clock gating circuit 160 enables transitions in the gated clock to wake up the processing circuits 130. It is noted that other suitable triggers can cause the power mode control circuit 140 to wake up the processing circuits 130, such that the processing circuits 130 exits the power saving mode. Then, the process returns to S310.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:
1. A device, comprising:
  a first core circuit including processing circuits, the processing circuits configured to:

measure an active current and a leakage current of the first core circuit under a present operation condition;

have at least a first power saving mode and a second power saving mode, wherein the second power saving mode is a deeper power saving or deeper sleep mode than the first power saving mode, the first power saving mode having (i) a first latency, which is a first amount of time the processing circuits take to enter to the first power saving mode or exit from the first power saving mode, the second power saving mode having (ii) a second latency, which is a second amount of time the processing circuits take to enter to the second power saving mode or exit from the second power saving mode, the first latency being smaller than the second latency;

determine a target residency time as a function of the active current, the leakage current, the first latency, and the second latency;

determine a power saving mode for the processing circuits based on the determined target residency time, wherein (a) the determined power saving mode is the first power saving mode when a predicted residency time of the processing circuits is shorter than the determined target residency time and (b) the determined power saving mode is the second power saving mode when the predicted residency time of the processing circuits is longer than the determined target residency time; and a power mode control circuit configured to receive information that is indicative of the power saving mode from the processing circuits, and control the processing circuits to enter the determined power saving mode.

2. The device of claim 1, wherein the processing circuits are configured to compare the predicted residency time with the determined target residency time.

3. The device of claim 1, wherein the power mode control circuit further comprises:
a power switch circuit configured to provide an adjustable supply voltage to the processing circuits; and
a clock gating circuit configured to provide a gated clock to the processing circuits.

4. The device of claim 3, wherein the clock gating circuit is configured to disable transitions in the gated clock and the power switch circuit is configured to maintain the supply voltage to the processing circuits to configure the processing circuits in the first power saving mode, and the power switch circuit is configured to switch off the supply voltage to the processing circuits to configure the processing circuits in the second power saving mode.

5. The device of claim 1, wherein the processing circuits are first processing circuits in the first core circuit, and the power mode control circuit is a first power mode control circuit in the first core circuit, and the device further comprises:
a second core circuit comprising:
second processing circuits configured to have at least the first power saving mode and the second power saving mode, the second processing circuits configured to determine a power saving mode for the second processing circuits; and
a second power mode control circuit configured to receive information from the second processing circuits that is indicative of the determined power saving mode for the second processing circuits, and control the second processing circuits to enter the determined power saving mode.

6. A method for power saving, comprising:
measuring an active current and a leakage current of a core circuit under a present operation condition by processing circuits;
implementing at least a first power saving mode and a second power saving mode, wherein the second power saving mode is a deeper power saving or deeper sleep mode than the first power saving mode, the first power saving mode having (i) a first latency, which is a first amount of time the processing circuits take to enter to the first power saving mode or exit from the first power saving mode, the second power saving mode having (ii) a second latency, which is a second amount of time the processing circuits take to enter to the second power saving mode or exit from the second power saving mode, the first latency being smaller than the second latency;
determining a target residency time as a function of the active current, the leakage current, the first latency, and the second latency;
determining a power saving mode for the processing circuits based on the determined target residency time, wherein (a) the determined power saving mode is the first power saving mode when a predicted residency time of the processing circuits is shorter than the determined target residency time and (b) the determined power saving mode is the second power saving mode when the predicted residency time of the processing circuits is longer than the determined target residency time; and
controlling to enter the determined power saving mode.

7. The method of claim 6, further comprising:
predicting a residency time for power saving; and
comparing the predicted residency time with the determined target residency time.

8. The method of claim 6, wherein controlling the processing circuits to enter the determined power saving mode further comprises:
providing a controllable supply voltage to the processing circuits; and
providing a gated clock to the processing circuits.

9. The method of claim 8, further comprising:
disabling transitions in the gated clock; and
maintaining the supply voltage to the processing circuits to configure the processing circuits in the first power saving mode.

10. The method of claim 9, further comprising:
switching off the supply voltage to the processing circuits to configure the processing circuits in the second power saving mode.

11. An apparatus, comprising:
a memory configured to store software instructions to determine a power saving mode; and
processing circuits configured to measure an active current and a leakage current of a core circuit under a present operation condition and have at least a first power saving mode and a second power saving mode, wherein the second power saving mode is a deeper power saving or deeper sleep mode than the first power saving mode, the first power saving mode having (i) a first latency, which is a first amount of time the processing circuits take to enter to the first power saving mode or exit from the first power saving mode, the second power saving mode having (ii) a second latency, which is a second amount of time the processing circuits take to enter to the second power saving mode or exit from the second power saving mode, the first latency being smaller than the second latency, the processing circuits further configured to execute the software instructions to:

determine a target residency time as a function of the active current, the leakage current, the first latency, and the second latency;

select a power saving mode from the at least the first power saving mode and the second power saving mode for the processing circuits based on the determined target residency time, wherein (a) the determined power saving mode is the first power saving mode when a predicted residency time of the processing circuits is shorter than the determined target residency time and (b) the determined power saving mode is the second power saving mode when the predicted residency time of the processing circuits is longer than the determined target residency time; and enter the determined power saving mode.

12. The apparatus of claim 11, wherein the processing circuits are configured to execute the software instructions to compare the predicted residency time with the determined target residency time.

13. The apparatus of claim 11, wherein the processing circuits include:
a power switch circuit configured to provide an adjustable supply voltage to the processing circuits; and
a clock gating circuit configured to provide a gated clock to the processing circuits.

14. The apparatus of claim 13, wherein
the clock gating circuit is further configured to disable transitions in the gated clock; and
the power switch circuit is further configured to:
maintain the adjustable supply voltage to configure the processing circuits in the first power saving mode, and
switch off the adjustable supply voltage to configure the processing circuits in the second power saving mode.

* * * * *